J. H. Manny.
Mower.
No. 289 Reissued Jan. 2. 1855
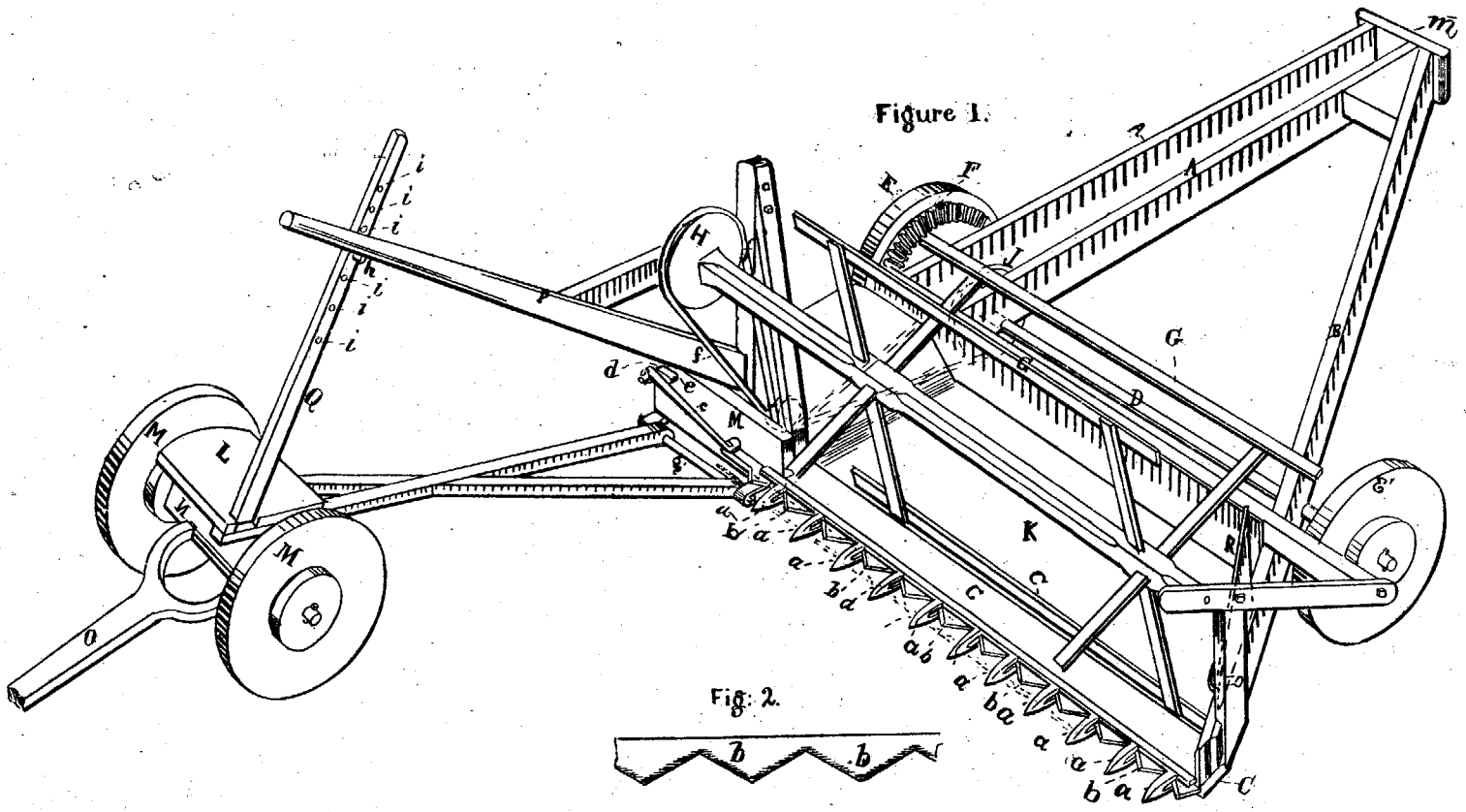

UNITED STATES PATENT OFFICE.

JOHN H. MANNY, OF ROCKFORD, ILLINOIS.

IMPROVEMENT IN HARVESTERS HAVING A LEADING TRUCK.

Specification forming part of Letters Patent No. 8,385, dated September 23, 1851; Reissue No. 289, dated January 2, 1855.

DIVISION D.

*To all whom it may concern:*

Be it known that I, JOHN H. MANNY, of Rockford, in the county of Winnebago and State of Illinois, formerly of Waddam's Grove, in the county of Stephenson and State aforesaid, have invented certain new and useful Improvements in Reaping and Mowing Machines, of which the following is a full, clear, and exact description, reference being had to the accompanying drawing, which forms part of this specification, and in which—

Figure 1 represents a view in perspective of my machine complete.

Reaping and mowing machines as heretofore constructed are liable to injury from coming in contact with stones, stumps, and other like obstructions not discovered by the driver in time to be avoided, and they are also liable to injury from running into holes in the surface of the ground. A remedy for this difficulty has been found by placing an outrider upon the draft-horse which travels nearest the standing grain, who, from this elevated and advanced position, can see obstacles in time to make the necessary preparation to avoid injury from them to the machine. If this outrider should also drive the horses, it would not dispense with the presence of a person upon the machine, since he would be unable to perform the duties of raising and lowering the cutter, and otherwise regulating the machine, as he could do if upon it. Hence this plan of protecting the machine from injury involves the employment of an extra driver, and the fatigue to the horse of carrying him while drawing the machine.

The object of my invention is to dispense with the outrider, and thus diminish the labor of the horses and save expense without sacrificing the advantages in avoiding obstacles, &c., derivable from the advanced and elevated position of the outrider.

My invention for effecting this object consists in placing in advance of the draft-bar by which the cutting-carriage or machine proper is drawn a leading carriage, to which the draft-bar is joined by a suitable link-pin or other flexible connection, and arranging upon this leading carriage a platform to support the driver, and extending forward from the cutter-carriage to the driver's stand a lever or arm for raising or lowering the cutter, thus enabling him while on the leading carriage to adjust the cutter as required to meet obstructions, adapt it to the height of the grass, &c., all of which can be conveniently done by the driver while guiding the horses, as in this advanced position he sees when a change is about to become necessary in ample time to make it.

The machine represented in the accompanying drawing, to which my improvements are applied, consists of two principal parts connected together by a hinged draft-bar. The first is a two-wheeled truck or leading carriage, to which the horses are harnessed, and which carries the driver. The second is also a two-wheeled carriage, and it supports the cutter and gearing. The cutter-carriage consists of a pair of parallel side rails, A A′, connected by transverse bars. These together constitute the frame which supports the driving-wheel and driving-gear. From the inner rail, A′, the bar C, which supports the cutter and the fingers, projects at right angles, and its lower extremity is held up by the end of the lever extending across to the rear end of the gear-frame and resting between its extremities upon an axle, D, on which the supporting-wheels E E′ turn. From this arrangement it will be seen that the outer end of the finger-bar is supported on the outer end of the lever B, which is held up by the weight of the frame, to which its inner end is attached. As the gear-frame as well as the lever are both rigid, it follows that when by the raising of the front end of the gear-frame the inner end of the finger-bar and cutter is raised the rear end of the gear-frame and the rear end of the lever B will be depressed proportionately, and will raise in a corresponding degree the outer end of the finger-bar, so as to maintain it at the same elevation under all circumstances as the inner end, so far as rigidity in the frame can accomplish that object.

The front bar, C, of the frame sustains the cutting apparatus. This consists of a series of stationary fingers, *a a*, which project forward, and, as the machine is advanced, enter the standing grain, and of a reciprocating sickle-blade, *b*. The latter is serrated, as represented in the drawings, and its edges are sickled. The sickle is connected at one extremity by means of a rod, *c*, with the wrist of a crank, *d*, which is secured to the front extremity of a shaft, *e*. This shaft extends backward toward the axle D, and carries at its hinder extremity a beveled pinion whose teeth engage with those of a corresponding beveled wheel, F, secured to one of the running wheels E, so that the latter becomes the driving-wheel of the machine, and in running over the ground causes the crank-shaft to revolve and impart a reciprocating movement to the sickle-blade.

To facilitate the operation of the cutting apparatus a reel, G, is employed to press the grass or grain toward the cutter and turn it over the bar upon the ground or a platform, as the case may be. The shaft of this reel turns upon bearings in the frame of the machine. It is fitted with a belt-pulley, H, which is encircled by a belt leading from a corresponding pulley, I, on the axle D, so that as the latter turns with the wheel E the reel is caused to revolve.

When the machine is arranged for cutting grain and is in operation the grain cut falls upon a platform, K, behind the cutting apparatus, and is raked off at the side of the machine by a person who stands upon the frame behind the platform.

In order to leave the side of the platform at which the grain is discharged perfectly free for the action of the raker, the belt *f*, by which motion is conveyed to the reel-shaft, is deflected from its direct course between the driving and leading pulleys I and H by passing it under guide-pulleys which are pivoted to the frame of the machine beneath the front edge of the raking-platform.

The leading-carriage, to which the team is harnessed, consists of a pair of wheels, M, an axle, N, a stand, L, for the driver, a tongue, hounds, &c., to harness the horses to, and a standard for aiding in maintaining the cutter at the proper height. The hinder extremity of the draft-bar, which in the example is forked at the rear end, is connected by a horizontal bolt, *g*, with the finger-bar on the hinder carriage, so that this carriage can tilt or turn upon the axle D of its running wheels without affecting the front axle-tree, N, to which the tongue O is secured. In order to control this tipping of the hinder carriage, and consequently to regulate the distance of its front rail and the cutting apparatus thereto attached from the ground, a strong bar or arm, P, projects from the frame of the hinder carriage over the frame of the front one, and moves up and down by the side of a standard, Q, erected upon the front part of the driving-platform on the forward carriage. The bar P may be held against the standard Q by a rectangular staple which embraces the standard. This standard is perforated with a series of holes, *i*, to which a pin, *h*, is fitted, that can be shifted from one hole to another. The projecting bar P is rigidly connected with the front part of the hinder-carriage frame, and hence when it is raised this portion of the carriage is correspondingly raised, and the cutting apparatus is lifted from the ground. It is then prevented from lowering down again by passing the pin *h* through the standard in the hole immediately beneath the bar P. This pin, although it prevents the bar P, and consequently the front of the hinder carriage, from sinking too low, does not prevent it from rising when the finger-bar strikes any protuberance on the ground; and hence while this arrangement affords a convenient means of regulating the distance of the cutting apparatus from the ground it diminishes the risk from the breakage which would result from contact with an unnoticed bowlder or other hard protuberance on the surface of the ground.

When this machine is used for cutting grain the driver stands upon the platform L of the front carriage, where he can drive the horses, observe the height of the grain, the nature of the surface of the ground, the position of obstructions, and can at the same time regulate the height of the cutter by raising or lowering the bar P, and with it the cutting apparatus, as circumstances may require. The raker stands upon the frame of the hinder carriage, behind the raking-platform K, where he can readily rake off the grain falling thereon and discharge it at the side of the machine most distant from the standing grain.

When the machine is used for mowing grass or other substances which do not require to be bound into sheaves the platform is removed, and the cut grass falls directly over the finger-bar and cutter upon the surface of the ground behind it, and is left in the track or wake of the machine. As the cut grass, falling at that side of the machine nearer the standing grass, would be in the way of the team and wheels when making a succeeding cut, and would also be injured by being trampled, I secure an adjustable hinged guard-plate, R, to the inner side of the oblique lever B. When the raking-platform K is in use this guard-plate is turned up, as is represented in Fig. 1; but when the platform is removed this guard-plate is depressed, and then turns the cut grass falling at that end of the cutting apparatus away from the standing grass, thus leaving a clear space for the wheels to run on, and the team to walk in while making a succeeding cut.

What I claim as my invention, and desire to secure by Letters Patent, is—

The leading-carriage to carry the driver in a position in advance of the cutter, where he he can readily see obstructions and observe the character of the surface of the ground in time to adjust the machine properly for operating upon any given part of its path before reaching the same, in combination with a cutter-carriage joined to the leading-carriage by a hinged bar or other flexible connection, the cutter-carriage being provided with an adjusting lever or arm, and extending forward to the leading-carriage, where it can be conveniently reached by the driver to enable him to raise and lower the cutter, as required.

In testimony whereof I have hereunto subscribed my name.

JOHN H. MANNY.

Witnesses:
P. H. WATSON,
F. G. DE FONTAINE.